June 4, 1940.　　　　F. WETTSTEIN　　　　2,203,243
LIQUID PRESSURE ACTUATED REGULATOR
Filed April 6, 1936　　　2 Sheets-Sheet 1
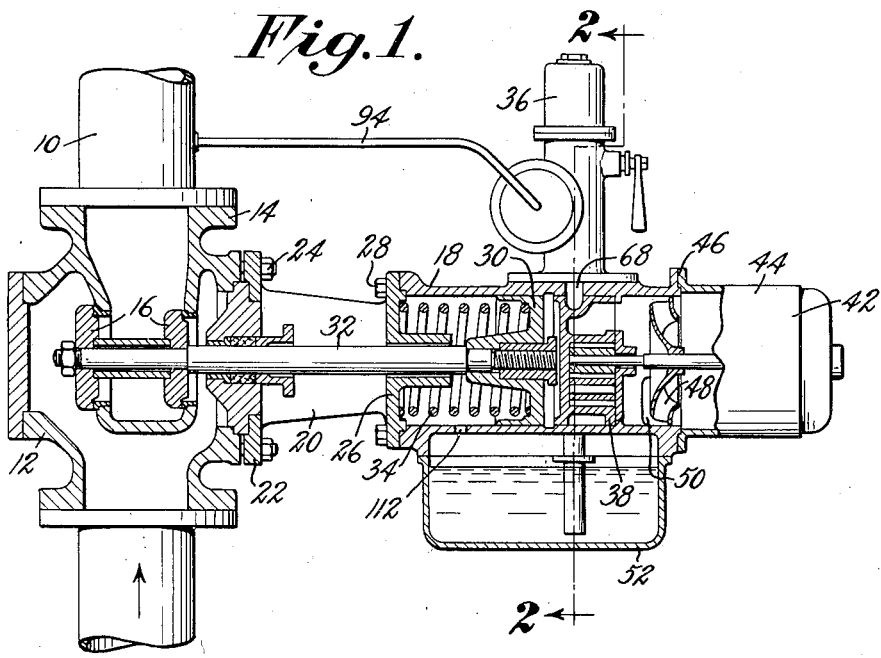
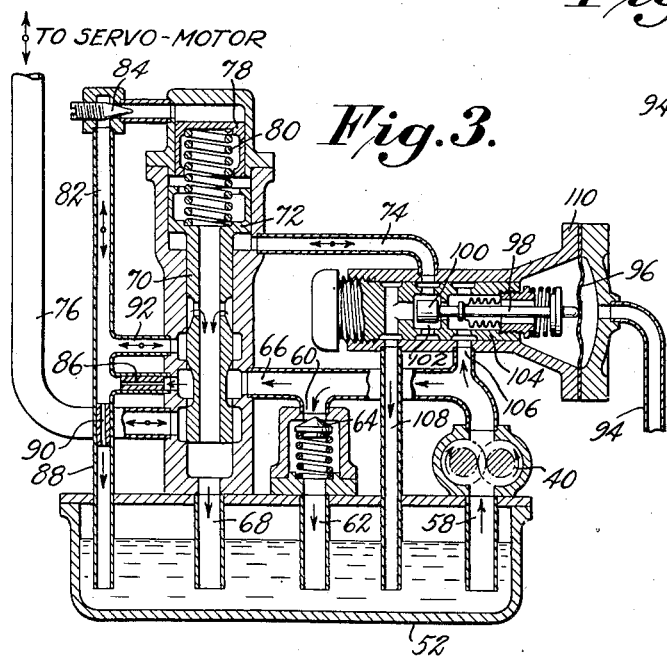
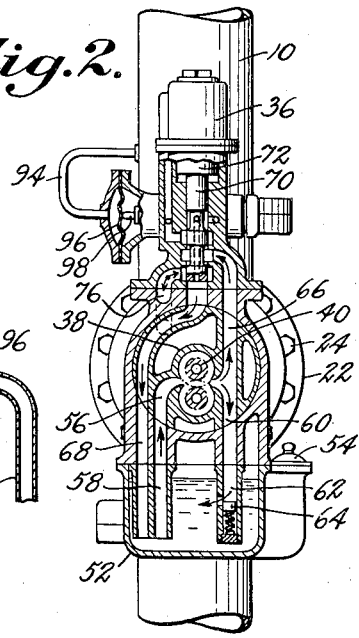
INVENTOR.
Fritz Wettstein
BY
ATTORNEY.

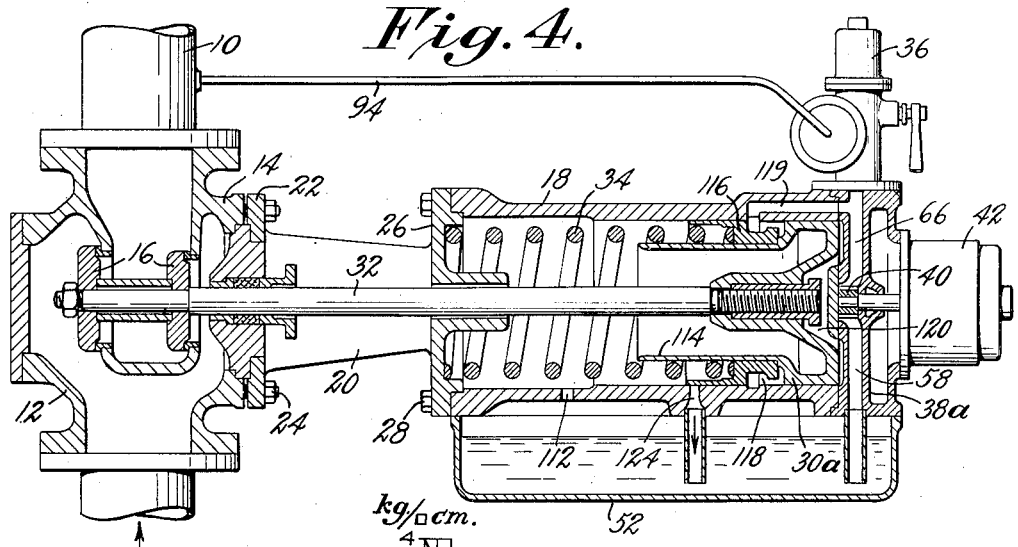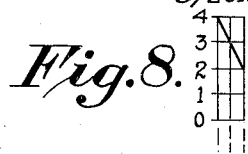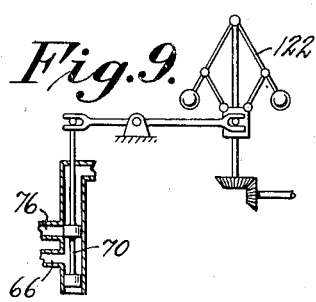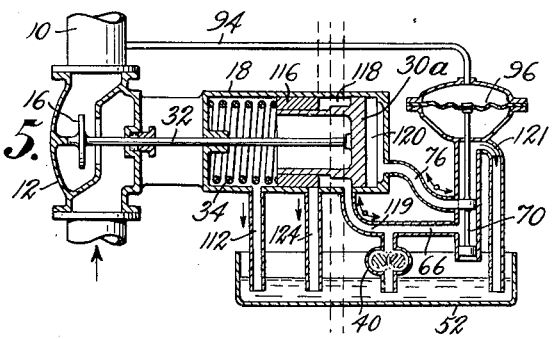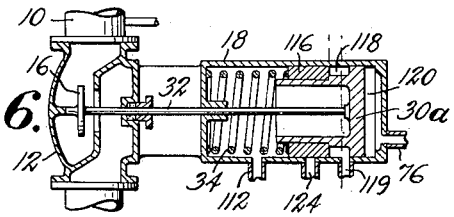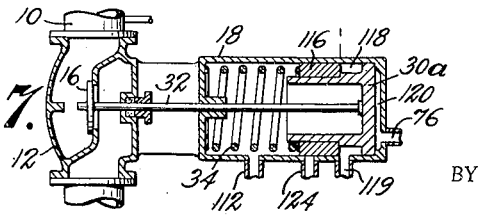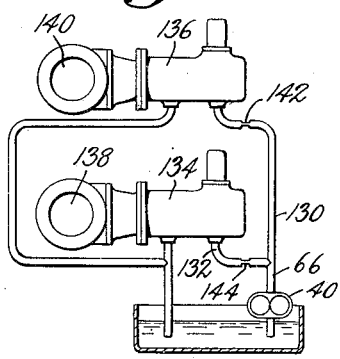

Patented June 4, 1940

2,203,243

UNITED STATES PATENT OFFICE 2,203,243

LIQUID PRESSURE ACTUATED REGULATOR

Fritz Wettstein, Stockholm, Sweden

Application April 6, 1936, Serial No. 72,951
In Germany April 9, 1935

1 Claim. (Cl. 50—10)

The present invention relates to liquid pressure actuated regulators of general application. More specifically, the invention relates to regulators of this kind employing liquid pressure actuated servo-motor apparatus for effecting the regulation, controlled through the medium of a regulating or relay device acted upon by an impulse derived from that which is to be regulated and serving to control the flow of pressure liquid to and from the servo-motor apparatus.

Still more specifically the invention relates to regulating apparatus of the above-described kind in which actuating pressure fluid is accumulated under pressure for operation of the servo-motor apparatus.

Among the several objects of the invention are; to provide regulating apparatus of the kind described in which the various parts required for a complete regulating mechanism are embodied in a single compact unit which may be finally adjusted before leaving the place of manufacture and which may be installed without further adjustment at its place of use; to provide an improved apparatus of this kind in which certain of the liquid actuated parts, particularly the relay mechanism, may be placed in desired position regardless of the direction of orientation of the part or parts to which the servo-motor mechanism is attached; and to provide apparatus of the kind described in which the servo-motor mechanism is combined with the other parts so as to provide pressure liquid accumulating space.

Other and more detailed objects of the invention together with the advantages to be derived from its use will appear from the following portion of this specification in which are described, by way of example, suitable forms of apparatus for carrying the invention into effect.

In the accompanying drawings, in which the above mentioned examples are illustrated, Fig. 1 is a view partly in elevation and partly in vertical central section of regulating apparatus embodying the invention applied to a steam pipe for regulation of the pressure of the steam flowing therethrough;

Fig. 2 is a view taken at right angles to Fig. 1 and partly in section and partly in elevation;

Fig. 3 is a diagrammatic representation in which the relay mechanism illustrated in Figs. 1 and 2 is developed in a single plane;

Fig. 4 is a view similar to Fig. 1 showing another form of apparatus embodying the invention;

Figs. 5, 6 and 7 are diagrammatic views showing apparatus of the kind illustrated in Fig. 4 in different operative positions;

Fig. 8 is a pressure diagram illustrating certain features of the apparatus in connection with Figs. 5 to 7;

Fig. 9 is a diagrammatic illustration showing the utilization of a different kind of regulating impulse; and Fig. 10 is a diagrammatic elevation showing a multiple installation of apparatus embodying certain features of the invention.

Referring now more particularly to Figs. 1 and 2, the installation illustrated provides regulation for flow of steam through a steam pipe 10 in response to changes in pressure within the pipe.

The means for controlling flow consists in a valve indicated generally at 12 and comprising a valve casing 14 and a double seated valve member 16.

A servo-motor cylinder 18 is connected to the valve body 14 by means of a yoke 20. Yoke 20 is flanged at 22 and is advantageously secured to the valve body 14 by means of a ring of bolts or studs indicated at 24. At its opposite end, the yoke 20 provides an end plate 26 for the servo-motor cylinder and is likewise advantageously made to provide a flange connection secured to the cylinder by means of a ring of studs indicated at 28. Cylinder 18 provides the working chamber for the servo-motor piston 30 which is connected to the valve member 16 by means of stem 32. A spring 34 within the cylinder acts on piston 30 to move the latter in a direction closing the valve member 16. The servo-motor piston is actuated by admission to and release from the servo-motor cylinder of pressure liquid under the control of liquid pressure mechanism hereinafter referred to generally as relay mechanism and indicated generally at 36.

The specific form of the relay mechanism may vary widely within the scope of the present invention and may or may not embody compensating mechanism which if employed may be of liquid actuated or other type. For purposes of illustration, relay mechanism involving the principles disclosed in U. S. Patent No. 1,976,820 granted to me October 16, 1934, is advantageously employed and such mechanism will hereinafter be described sufficiently for an understanding of the present invention. It is to be understood, however, that this invention is not limited to the employment of this kind of regulating or relay mechanism.

The servo-motor cylinder is extended to the right, as viewed in Fig. 1, to provide a housing for a pump casing member 38 in which is situated a gear pump 40 driven by an electric motor 42, the shaft of which is coaxial with the axis of cylinder 18 and the housing 44 of which is provided with a flange connection 46 to the end of the cylinder 18 so that the motor housing constitutes an end plate for the cylinder. The motor is advantageously cooled by means of a fan 48 exhausting through suitable openings 50 in the motor end of the cylinder.

A liquid supply tank or reservoir 52 is attached to the bottom of cylinder 18 and is advantageously provided with a filling opening 54 at one side of the cylinder.

The pump housing member 38 is provided with an inlet channel 56 registering with a suitable supply passage in the cylinder casing to draw liquid, usually oil, through the suction pipe 58 which extends into the reservoir 52. A second passage 60 in member 38 provides a return connection to the pipe 62 which is provided with a spring loaded relief valve 64 for governing return flow of liquid from the pump tc the reservoir, thus providing a means for maintaining the pump discharge under pressure and limiting the maximum pressure of this discharge. A passage 66 provides for flow of pressure liquid to the relay mechanism which in turn controls its flow to the servo-motor cylinder and liquid released from the servo-motor cylinder by the relay mechanism and expelled therefrom under the influence of spring 34 is returned to the reservoir 52 through the passage 68, a portion of which is formed in the pump casing member 38.

The flow of liquid in the above described passages is indicated by the arrows in Fig. 2.

Referring now more particularly to Fig. 3, the relay mechanism indicated generally at 36 in Figs. 1 and 2 is shown in diagrammatic form for the sake of clarity and in this figure functionally equivalent parts and passages are numbered to correspond with what is shown in Figs. 1 and 2.

In this mechanism, a balanced regulator valve 70 is moved under the influence of pressure liquid flowing to or from piston 72 through connection 74. Downward movement of valve 70 from the mid-position shown in the drawings admits pressure liquid from connection 66 to the connection 76 leading to the servo-motor cylinder and upward movement of valve 70 from the mid-position releases pressure liquid from the servo-motor cylinder to the return connection 68.

In the apparatus shown, the position of valve 70 is influenced by a return motion piston 78 between which and piston 72 a spring 80 is interposed. Pressure fluid is admitted above piston 78 through the return motion connection 82 and governing restriction 84, connection 82 being in communication with the pressure liquid supply connection 66 through the restriction 86 and with the reservoir through the return pipe 88 in which is located a restriction 90. The pressure of the liquid for actuation of the return motion piston is controlled through the connection 92, the flow through which is governed by the position of the valve 70.

The details of this return motion mechanism and its mode of operation are immaterial to the present invention and need not be described in further detail. For a full disclosure of this mechanism, reference may be had to my granted Patent No. 1,976,820, previously mentioned.

As previously stated, control of the admission to and release from the servo-motor cylinder of the pressure liquid is effected by movement of the valve 70 which is in turn controlled by flow of pressure liquid to or from the piston 72.

In the embodiment illustrated, this is effected by the action of pressure of the steam in the pipe 10 transmitted through connection 94 to diaphragm 96 which in turn actuates the spring loaded spindle 98 having a controlling valve head 100. The valve head 100 is situated in a chamber 102 in an annular member 104 in which the spindle 98 is mounted. Chamber 102 is placed in communication, through an orifice in member 104 which is controlled by the valve head 100, with the branch connection 106 leading from the discharge passage 66 from the pump. Chamber 102 is also in communication with the connection 74 leading to the valve actuating piston 72. Flow of pressure liquid from chamber 102 is by way of a second orifice in member 104, controlled by the position of valve head 100, and a return connection 108.

As will be evident from the drawings, the pressure of the liquid in chamber 102 and consequently the pressure acting to move the valve 70 will be varied in accordance with the position of the valve head 100 axially in relation to the member 104. If the valve head 100 moves to the left relative to member 104, the inlet opening to chamber 102 is increased and the outlet opening therefrom is decreased, with consequent rise in pressure in this chamber and connection 74, resulting in upward movement of valve 70. Movement of the valve head 100 to the left relative to member 104 reduces the inlet opening to chamber 102 and increases the outlet opening with consequent decrease in pressure in connection 74 and resultant downward movement of valve 70 under the influence of spring 80 and the liquid pressure above piston 78. The effect of movement of valve 70 on the servo-motor piston has already been described.

Advantageously, member 104 is made axially adjustable within the casing 110 in which the diaphragm 96 is mounted so as to provide any desired axial relationship between valve head 100 and member 104 with a given pressure acting on the diaphragm 96.

From the preceding description, the operation of the apparatus as a whole, as shown in Figs. 1 and 2, will be readily understood. In the application there shown, the valve member 16 acts as a pressure reducing valve for maintaining constant pressure in pipe 10 on the discharge side of the valve, the release mechanism just described acting upon decrease in pressure in the connection 94 to cause pressure liquid to be admitted to the servo-motor piston, thus moving the piston to the left as viewed in Fig. 1 to incerase the control valve opening and the pressure in pipe 10 on the discharge side of the valve. Upon increase in the pressure within pipe 10 on the discharge side of the control valve, the reverse action takes place, the regulating mechanism acting to release pressure liquid from the servo-motor cylinder which returns to the reservoir through the return connection 68 and permits the control valve to be moved toward closed position under the influence of spring 34 to increase the throttling effect of the control valve. Any leakage of pressure liquid past the servo-motor piston is returned to the reservoir 52 through the drain port 112.

In Fig. 4 there is illustrated a form of apparatus in which pressure liquid is accumulated to assist in the actuation of the servo-motor piston. This arrangement is particularly vantageous in the case of installations where a relatively large and powerful servo-motor is required, since with this arrangement rapid action of a large servo-motor piston is obtainable without the necessity for equipping the regulator with a large capacity pump.

In the arrangement shown in this figure, the regulator is shown as operating a pressure control for a steam pipe and the control valve and mounting parts for the regulator are similar to the corresponding parts in Fig. 1 and have been designated by corresponding numerals.

In this instance, the servo-motor cylinder 18 is closed at one end by a pump casing member 38a similar to the member 38 shown in Fig. 1 and carrying motor 42 for driving the pump 40. The general arrangement of flow passages with respect to the relay is similar to that previously described and need not be again described in detail.

In the present construction however, the servo-motor piston 30a is made in the form of a differential piston having an extension 114 of smaller diameter than the portion of the piston working in the cylinder 18. This extension or skirt forms a guide for the annular accumulator piston 116 disposed between the skirt and the cylinder. The accumulator piston is acted on by the servo-motor spring 34 and between these two pistons there is formed an accumulator space 118 for pressure liquid.

As will be observed from the figure, the outer diameter of the accumulator piston is made the same as the large diameter of the differential piston and the inner diameter of the accumulator piston is made equal to the small diameter of the differential piston. Advantageously the relation of the opposed active areas of the differential piston which are acted on by the pressure liquid is made in the ratio of 1 to 2.

In addition to a connection for the admission to and release of pressure liquid from the servo-motor cylinder chamber 120, the accumulator space 118 is placed in communication with the discharge side of the liquid pump by a connection 119 as appears more clearly from the diagrammatic Figures 5 to 7 in which the apparatus has been schematically shown in different positions of the parts in order to more clearly illustrate the mode of operation.

In Fig. 5, the control valve 16 is shown in open position with the accumulator piston 116 forced away from the servo-motor piston 30a by the pressure liquid in the accumulator space 118. Fig. 6 shows the same apparatus with the control valve 16 open but with the accumulator piston abutting against the limiting stop surface of the servo-motor piston. Fig. 7 shows the two pistons in the same position relative to each other as in Fig. 6 but with the piston assembly moved to a position in which the control valve 16 is closed.

In these diagrammatic figures, a simplified relay mechanism is indicated for purposes of clarity in which the liquid control valve 70 is shown as being directly actuated by movement of the diaphragm 96 to which the pressure from pipe 10 is transmitted.

It will be understood that the invention is equally applicable to regulators operating in response to various different kinds of regulating impulses and is not limited merely to pressure regulation. By way of example, there is shown diagrammatically in Fig. 9 an arrangement in which the regulating mechanism is indicated as operating in response to speed variation as reflected in a speed governor 122. The speed governor for governing the liquid control valve would ordinarily be used in the event the regulator is used to control the speed of a turbine or other engine supplied with motive fluid through pipe 10.

If we now consider the action which takes place in the apparatus shown in Figs. 4 to 7, a rise in pressure in the pipe 10 causes the valve 70 to be moved downwardly to permit escape of pressure liquid from the servo-motor chamber 120 in the direction indicated by the arrow 121. As a result, the reduced pressure in this chamber permits the spring 34 to move the piston assembly to the right as viewed in the figure to close the control valve 16. If the pressure in pipe 10 drops, the pressure reduction on the diaphragm causes the valve 70 to rise to admit additional pressure liquid from the pump 40 to the servo-motor cylinder 120 through the connections 66 and 76. This causes the servo-motor cylinder to move toward the left and produces opening movement of the control valve 16.

The operation of the accumulating feature of the device is most readily understood by first considering the parts in the position shown in Fig. 7 in which the control valve 16 is closed and the accumulator space 118 is empty of liquid. Under these conditions, the accumulator piston is forced by spring 34 against the stop surface on the servo-motor piston and the latter is forced to its right hand end position. This is the position the parts assume for example when the pump 40 is not operating and the liquid in the apparatus is not under pressure.

If under these conditions, the pump 40 is started and it is assumed that the valve 70 is in its mid-position, the first action of the pump is to force liquid into the accumulator space 118, forcing the two pistons apart against the action of spring 34. Spring 34 is for example made of such strength that the accumulator piston is forced by the rising oil pressure away from the servo-motor piston only after the liquid pressure has risen to a pressure exceeding two kilograms per square centimeter, as is indicated in the diagram of Fig. 8. If the pressure in the chamber 118 rises above this value, the accumulator piston moves to the left until it uncovers the overflow port 124 in the servo-motor cylinder. This may occur for example when the liquid pressure reaches a value of four kilograms per square centimeter, as is also indicated in the diagram of Fig. 8.

The accumulator piston in this arrangement also serves as a pressure limiting valve for limiting the maximum pressure to which the liquid pressure in the apparatus can be raised by pump 40 and consequently in an arrangement such as this, a separate pressure relief valve such as valve 64 in Fig. 2 can be dispensed with.

If under the conditions described, the pump is started and the apparatus brought up to full pressure, the condition will be that in which the accumulator space 118 is filled to maximum capacity with liquid, the liquid in the system on the discharge side of the pump being under a pressure of four kilograms per square centimeter.

If now the valve 70 is moved upwardly from its mid-position due to a decrease in pressure on the diaphragm to permit the flow of pressure liquid into the servo-motor chamber 120, a part of the liquid being supplied by pump 40 under pressure will flow to the servo-motor chamber while a part of the liquid supplied by the pump will continue to flow through the pressure relief port 124.

If, however, the valve 70 is moved upwardly by a sufficient amount, the entire output of the pump 40 may flow to the servo-motor cylinder and if the valve 70 is moved, for example, to a wide open position, the path of flow to the servo-motor cylinder may be opened to such an extent that the pump is unable to supply sufficient liquid to actuate the servo-motor while at the same time continuing to maintain the four kilogram per square centimeter pressure required to keep the accumulator space filled to capacity against the pressure of the spring 34. In consequence of this, the accumulator piston is moved relative to the servo-motor piston and the accumulated liquid in the accumulator space acts to assist in maintaining pressure in the system and to supply liquid from this space to help fill the volume of the servo-motor cylinder, the latter only being increased as the servo-motor piston moves toward the left. It will thus be evident that the accumulator chamber provides a reservoir of liquid under pressure which permits comparatively rapid actuation of a relatively large servo-motor piston without the necessity for providing a large capacity pump which would have sufficient capacity to supply the oil necessary to effect rapid movement of the servo-motor piston without undue drop in liquid pressure. As previously mentioned, the servo-motor piston is preferably constructed with a relation of two to one of the areas of the opposed active faces of the piston when the regulator is in equilibrium. The pressure in the servo-motor cylinder chamber 120, disregarding the unbalance, if any, of the control valve 16, must be in this event equal to one half the pressure of the accumulator chamber 18. In this connection, it is to be noted that the full stroke of the accumulator piston is preferably twice as great as the full stroke of the servo-motor piston.

With this arrangement, it will be evident that the opening of the control valve 16 by the servo-motor piston can be effected with extreme rapidity, this speed being limited only by the resistance to flow of the liquid in the liquid passages and the resistance to flow through the opening past the valve 70.

If it is for example assumed that the valve 16 is fully closed and the accumulator space fully charged and that under these conditions the valve 70 is fully opened very suddenly, the servo-motor piston moves from the position shown in Fig. 7 to the position shown in Fig. 6. The accumulator piston on the other hand moves from the position shown in Fig. 4 to the position shown in Fig. 5.

With the relation of piston surfaces and piston strokes previously mentioned, the volume of liquid forced out of the accumulator chamber will be equal to the volume of liquid that has entered the servo-motor chamber. Consequently, full opening of the control valve 16 from a closed position of the valve and with a fully charged accumulator can be effected without the necessity for any additional volume of liquid to be supplied by the pump during the opening period.

The dimensions of the accumulator and servo-motor cylinder chambers and the strokes of the pistons may obviously be varied in order to meet different requirements. The volume of the required accumulator space will depend on the number of regulating impulses per unit time to which the regulator is subjected and also upon the absolute value of the impulses.

In the foregoing, the action of the apparatus in opening the valve has been described. Obviously, the closing action occurs in the opposite manner. If, for example, with the parts as shown in Fig. 5, the valve 70 is suddenly moved downwardly upon increase in pressure on the diaphragm to release pressure liquid from the servo-motor chamber 120, the servo-motor piston is moved rapidly toward the right under the influence of spring 34. Under such conditions, pump 40 can not deliver pressure liquid to the servo-motor cylinder and the entire discharge from the pump goes to the accumulator chamber which enlarges until the relief opening 124 is uncovered by the accumulator piston. If the quantity of liquid supplied by the pump per unit time is not sufficient, during a period of rapid movement to the right of the servo-motor piston, to move the accumulator piston relative to the servo-motor piston as rapidly as the servo-motor piston moves relative to the cylinder, the accumulator piston also moves to the right.

Regulating apparatus embodying the invention may advantageously be employed in multiple installations utilizing a single liquid pump, as is illustrated diagrammatically in Fig. 10. In this arrangement, branch pipes 130 and 132 are provided, leading from the pump discharge line 66, and delivering actuating liquid to the respective relay mechanisms of separate regulators 134 and 136 which control valves 138 and 140 respectively. In these branch pipes, throttling orifices 142 and 144 are provided, the size of these orifices being such that the total volume of the oil streams flowing to the two regulators 134 and 136 does not exceed the discharge capacity of the pump 40. If for example the regulator 134 should be called upon to open suddenly, the throttling orifice 142 in branch 130 prevents liquid from being withdrawn from the regulator 136 and flowing to the regulator 134. The liquid required for actuation of the regulator 134 is thus supplied from the accumulator chamber forming a part of this apparatus.

Apparatus constructed in accordance with the principles herein disclosed provides many advantageous features of practical importance.

Considering for a moment the general arrangement illustrated in Figs. 1 and 2, it will be observed that this construction provides for a compact and unitary regulating device incorporating within a single unit all of the necessary elements of a complete regulator. This arrangement permits the necessary and delicate adjustment of the various parts of the apparatus before it leaves the place of manufacture and avoids the necessity for expensive supervision and adjustment of the device by a factory trained expert at the place where the device is installed, which may be quite remote from the place of manufacture.

All that is required is that the regulating valve or its equivalent be installed, the proper connection made between the device which is to be regulated and the diaphragm governor or other element which is to receive the regulating impulse and proper electrical connection made for energizing the liquid pump.

In the arrangement illustrated, a great deal of external piping for conveying liquid under pressure is eliminated, numerous of the flow passages being cored within the various housing parts. This eliminates possibilities of undesirable external leakage. Also the arrangement is such that the entire apparatus can in practically all instances be arranged in a position so that any leakage that does occur drains automatically by gravity to the liquid reservoir 52 which is in the nature of a sump.

In Figs. 1 and 2, the regulator has been shown as applied to a vertically extending pipe. The same regulator can be equally well applied to a horizontal or angularly disposed pipe while remaining in vertical or substantially vertical position so that the liquid contents of the regulator can drain back to the sump. This is accomplished by merely rotationally shifting the yoke 20 with respect to the valve housing or with respect to the servo-motor cylinder. It will be evident that if the connections between these parts are made circular as shown and are fastened by comparatively closely spaced studs or bolts, it is possible to shift, rotationally by relatively small amounts, parts of standard construction, so that positioning of the regulating mechanism in a vertical or substantially vertical plane is readily accomplished for almost any angular position of a steam or other pipe in which the control valve is to be inserted.

The advantage of the liquid accumulator arrangement with respect to the factor of rapid actuation of a large servo-motor with the aid of only a small capacity liquid pump is manifest. In the particular arrangement disclosed, the advantage of the accumulator feature is obtained with relatively very few and simple parts and in this arrangement the servo-motor spring has the dual function of actuating the servo-motor piston in one direction and also acting to maintain the pressure on the liquid in the system. This dispenses with separate devices heretofore required for pressure loading of the accumulated liquid in prior forms of apparatus of this nature.

While for purposes of illustrating the invention, certain specific forms of apparatus have been described and illustrated, it will be understood that the invention is not limited to such specific forms of apparatus and is to be understood as embracing all forms of construction falling within the scope of the appended claim when it is construed as broadly as consistent with the state of the prior art.

I claim:

In a liquid pressure actuated regulator, a control valve for controlling that which is to be regulated, said valve having a casing and a valve spindle, a servo-motor having a piston connected to operate said valve spindle, relay mechanism responsive to an impulse from that which is to be regulated for controlling flow of actuating liquid to and from said servo-motor, a pump for supplying actuating liquid to said relay mechanism and to said servo-motor and a liquid reservoir from which liquid is withdrawn by the pump and to which liquid is returned from said servo-motor, a driving motor for operating said pump; said valve spindle, said piston, said pump and said driving motor being arranged in straight line assembly, and said servo-motor, said relay mechanism and said pump providing a pre-adjustable closed system for flow of actuating fluid and the parts providing said system being mounted together with the control valve and driving motor to provide a single unitary regulator structure ready for installation and operation.

FRITZ WETTSTEIN.